INVENTOR
RAYMOND BROOKE
BY
DEZSOE STEINHERZ
ATTORNEY

INVENTOR
RAYMOND BROOKE
BY
DEZSOE STEINHERZ
ATTORNEY

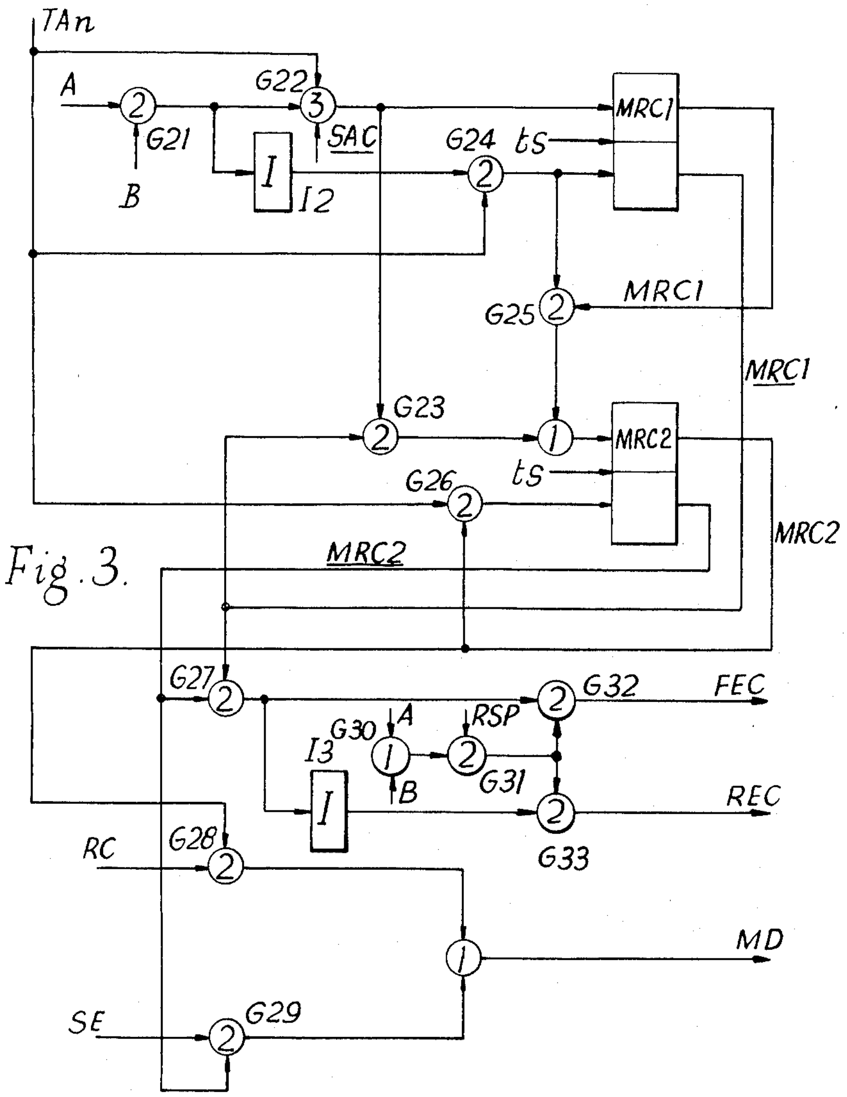
Fig. 3.
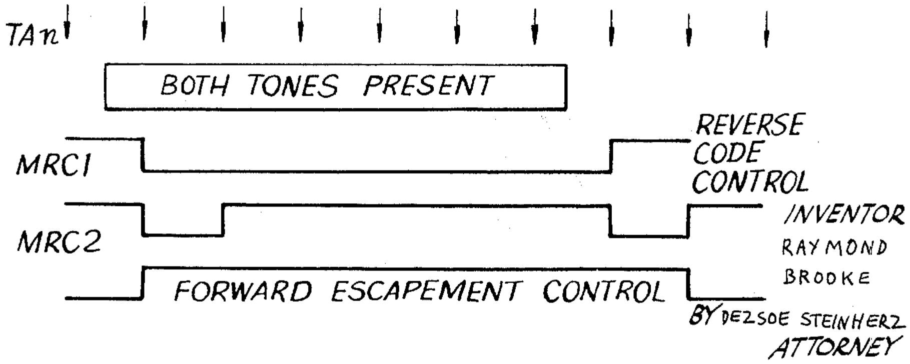
INVENTOR
RAYMOND BROOKE
BY DEZSOE STEINHERZ
ATTORNEY

INVENTOR
RAYMOND BROOKE
BY
DELSOE STEINHERZ
ATTORNEY

INVENTOR
RAYMOND BROOKE
BY
DEZSOE STEINHERZ
ATTORNEY

INVENTOR
RAYMOND
BROOKE
BY DEZSOE STEINHERZ
ATTORNEY

INVENTOR
RAYMOND BROOKE
BY
DEZSOE STEINHERZ
ATTORNEY

United States Patent Office 3,263,215

Patented July 26, 1966

3,263,215

ERROR CORRECTING ARRANGEMENT FOR PUNCHED TAPE ELECTRICAL SIGNALLING SYSTEM

Raymond Brooke, Ile Perrot, Quebec, Canada, assignor to British Telecommunications Research Limited, Taplow, England, a British company Filed Dec. 7, 1962, Ser. No. 243,064
Claims priority, application Great Britain, Dec. 8, 1961, 44,066/61; Aug. 16, 1962, 31,500/62
11 Claims. (Cl. 340—146.1)

Figures 1, 4:
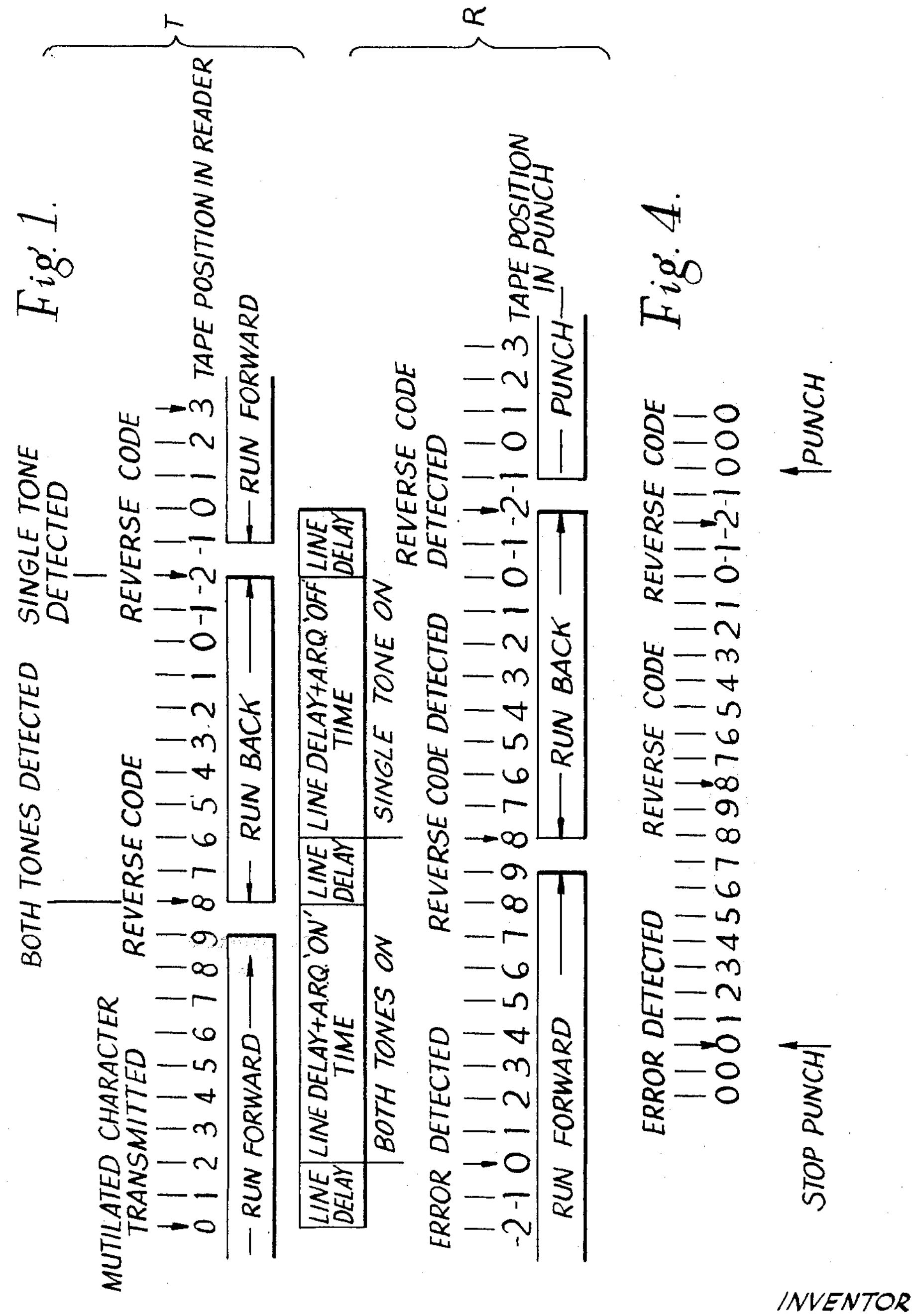

The present invention relates to electrical signalling systems and is more particularly concerned with systems suitable for the transmission of data by what may be considered as telegraph practice. This conveniently makes use of a 2-condition or binary code in which each element transmitted has one or other of two possible values. Conveniently transmission takes place by suitable modulation of a carrier current.

In systems of this kind where data are transmitted, for instance for the operation of a computer, it is particularly important that there should be a high degree of accuracy in the transmission of the information as errors might vitiate the whole computing operation and moreover they would not be apparent on inspection as might be the case with a plain language telegraph message. Accordingly, if any error should occur, for instance owing to interference on the signalling channel, this fact should at once be made known so that steps can be taken to correct the error by retransmission.

It is already well known that by the choice of certain error-checking codes which contain some proportion of redundant information, most of the errors which are likely to occur can be detected. If the codes are suitably chosen, it is also possible to provide for automatic correction of most errors without retransmission but this generally requires much more redundant information so that the speed of transmission may be considerably reduced and in addition the circuits required for doing this tend to become complicated. It may be mentioned that whereas in telegraphy it is usual that the elements forming a character together represent a particular letter or character, in data transmission it will often happen that each information element has its own significance and a number of elements are grouped with the appropriate number of parity elements to form a character of arbitrary length.

In one system of data transmission which may be very convenient in practice, the information to be transmitted is presented in the form of punched paper tape and the resulting information at the receiving end is also recorded in the form of punched paper tape which may be identical with that at the transmitting end. Automatic error correction in these circumstances has presented difficulties and usually it has been necessary for the tape to be pulled back manually at the sending end to permit retransmission of the mutilated character. Even then the tape produced at the receiving end is likely to involve an ineffective portion containing the wrongly transmitted character.

If however use is made of tape readers and reperforators which are reversible so that they can be made to operate in either direction, it then becomes possible to arrange for a back spacing operation so that the perforated tape obtained at the receiving end is identical with the tape at the transmitting end even after the automatic correction of transmission errors.

As an alternative, a reversible counter and a non-reversible reperforator may be used to achieve the same ends. When an error is detected, the reperforator ceases punching and stepping and the counter starts to count each subsequent character beginning with the erroneous character and the direction of counting is reversed whenever reverse code is detected. When the counter reaches zero for the second time after the detection of the error, punching is resumed and counting ceases. Thus the tape produced at the receiving end is again identical to that transmitted, bearing no trace of the errors.

A further and perhaps preferable alternative is to make use of a counting or timing device at each end of the line in which case no reversing equipment is needed at the receiving end and it is not necessary to employ a reverse code signal.

The chief object of the invention is to provide suitable control circuits for enabling automatic error correction on these lines to be brought about.

According to one feature of the invention, in a signalling system for the transmission of information recorded on a tape to produce a corresponding record on a tape at the receiving end and employing error detection equipment at the receiving end, in response to the detection of an error the recording operation at the receiving end is arrested and a signal is sent back to the transmitting end to cause the tape reader to reverse its movement for a predetermined time and then again operate in the forward direction, the recording operation being caused to resume after a delay equal to the time required for the reader to step back and forward again to its original position.

According to another feature of the invention, when the tape reader reverses its movement, it sends a characteristic signal forward which causes the recording device at the receiving end to reverse its movement, at the same time sending back another signal which causes the tape reader to reverse back to normal and send another characteristic signal forward, on receipt of which the recording device reverses back to normal and recording is resumed.

According to a further feature of the invention, when the tape reader reverses its movement, it sends a characeristic signal forward which causes the recording device at the receiving end to send back a second signal and connect up a reversible counter which responds to further character signals, the second signal causing the tape reader to reverse back to normal and send another characteristic signal forward to cause the counter to be reversed, the counter serving to cause the recording operation to be resumed when it reaches its original position.

Still another feature of the invention is that in a signalling system for the transmission of information recorded on a tape to produce a corresponding record on a tape at the receiving end and employing error detection equipment at the receiving end, in response to the detection of an error a signal is sent back to the transmitting end to cause the tape reader to reverse its movement and to start a timing device, the movement of the tape reader being reversed back to normal when the timing device completes its operation, while at the receiving end a second timing device is started when the error is detected and the recording operation is arrested until the second timing device has completed its operation, the periods of the two timing devices being so chosen that recording is resumed on the retransmission of the character which was initially incorrectly transmitted.

The arrangement according to the invention has the obvious advantage that when an error is detected, it is then corrected by retransmission but without any operator control since the operation is completely automatic. Moreover the punched tape at the receiving end is identical with that generating the signals at the transmitting end and no superfluous punching takes place to indicate that an error has occurred. Furthermore all errors that are detected are corrected whatever their character and this results in the considerable simplification of the control circuits.

Arrangements are preferably included for checking that the reverse code sent from the transmitting end is not itself mutilated. If this should happen, sending is stopped and manual intervention is then necessary to deal with the original error and restore the signalling circuit to its proper operation.

In the form employing timing devices, the transmitter is preferably arranged to send a deliberately mutilated character after the supervisory signal is detected so as to prevent false operation in case the supervisory signal is simulated by a fault on the line. If no special provisions were made, the tape reader would be reversed but the reperforator would continue to punch without any interruption. The arrangement adopted means that when the correcting effect is brought into action at the transmitting end, the mutilated character ensures that an error will be detected at the receiving end and consequently the whole correcting process will be initiated.

Figure 2:
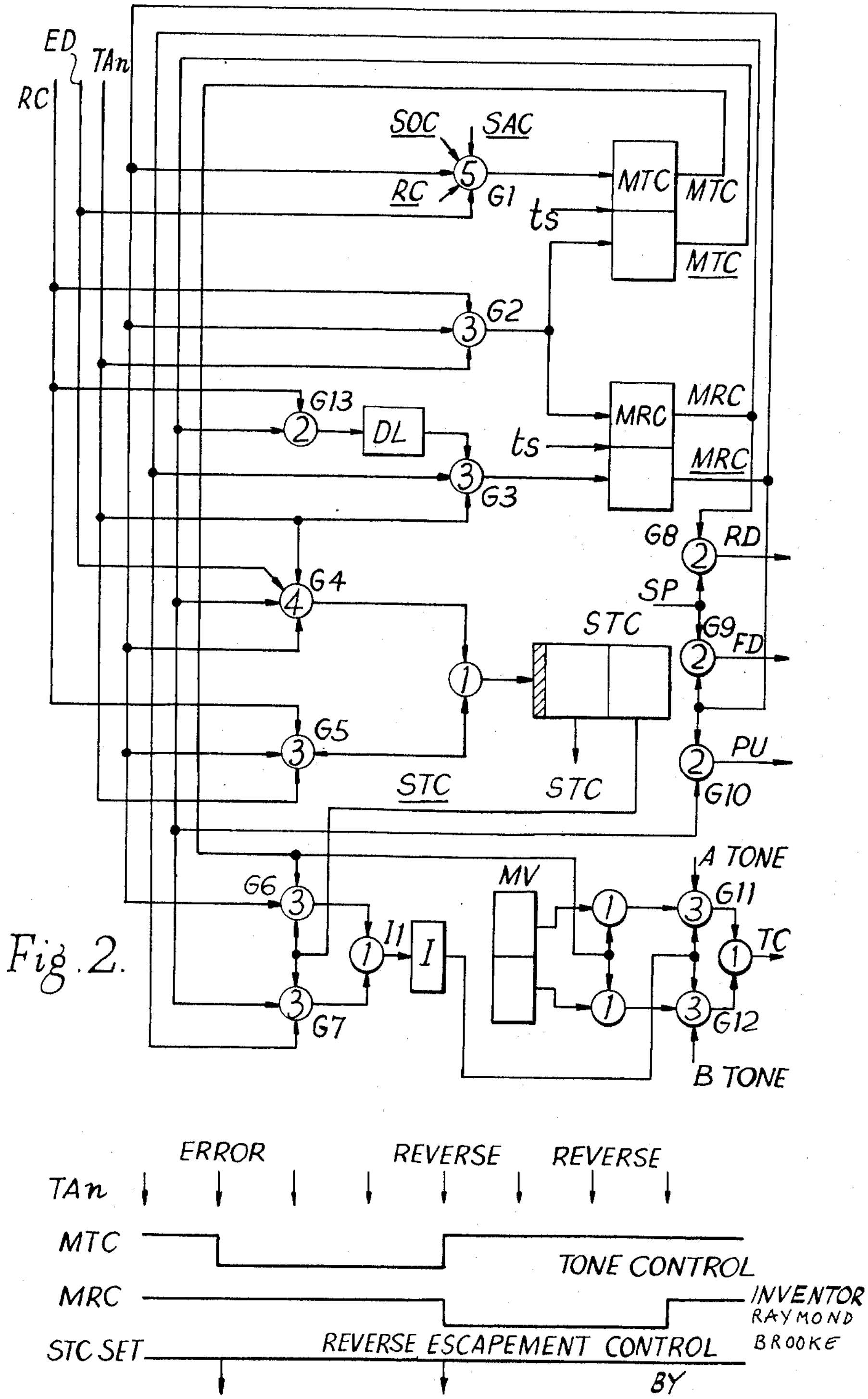
Figure 5:
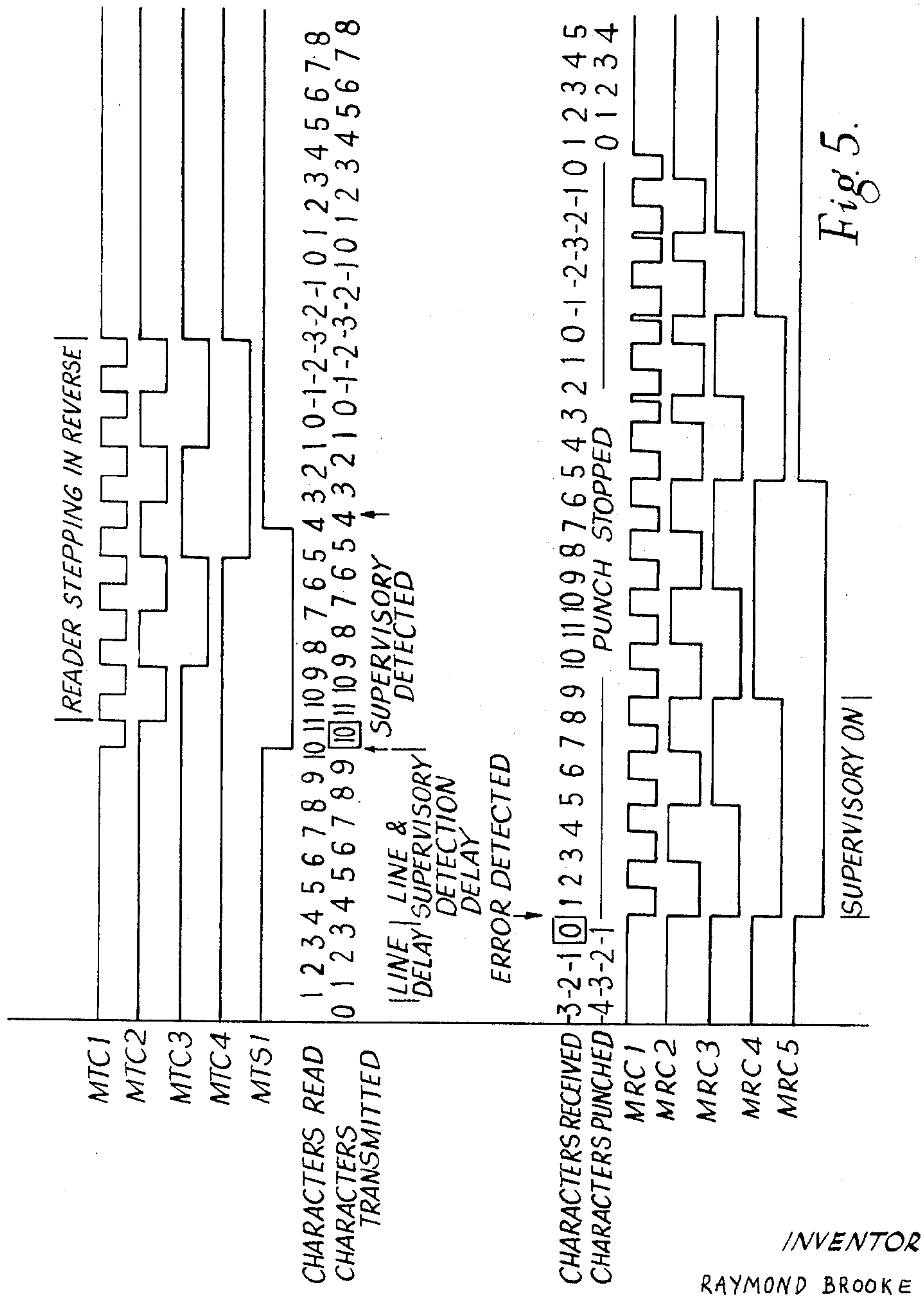
Figure 6:
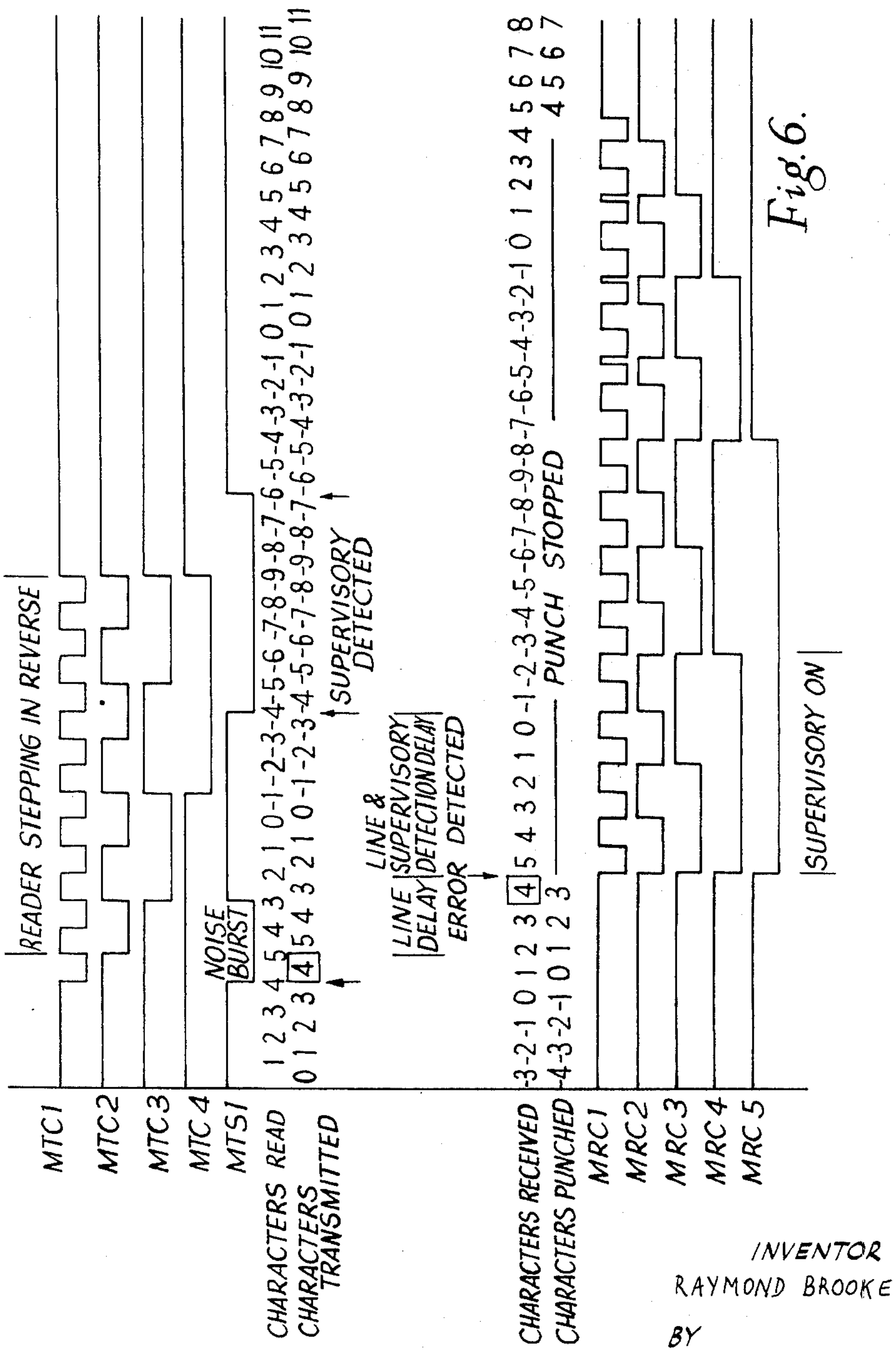
Figure 7:
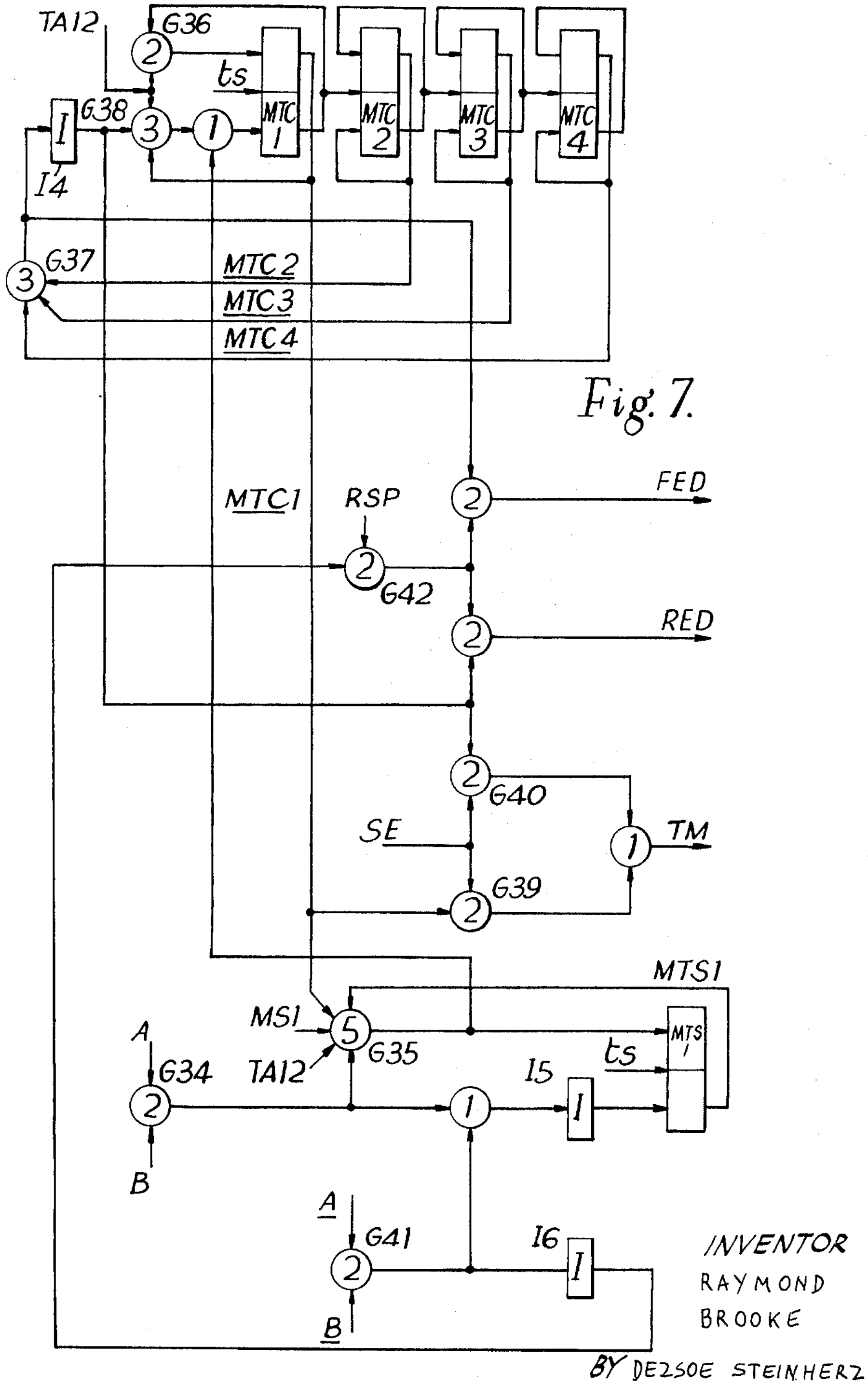
Figure 8:
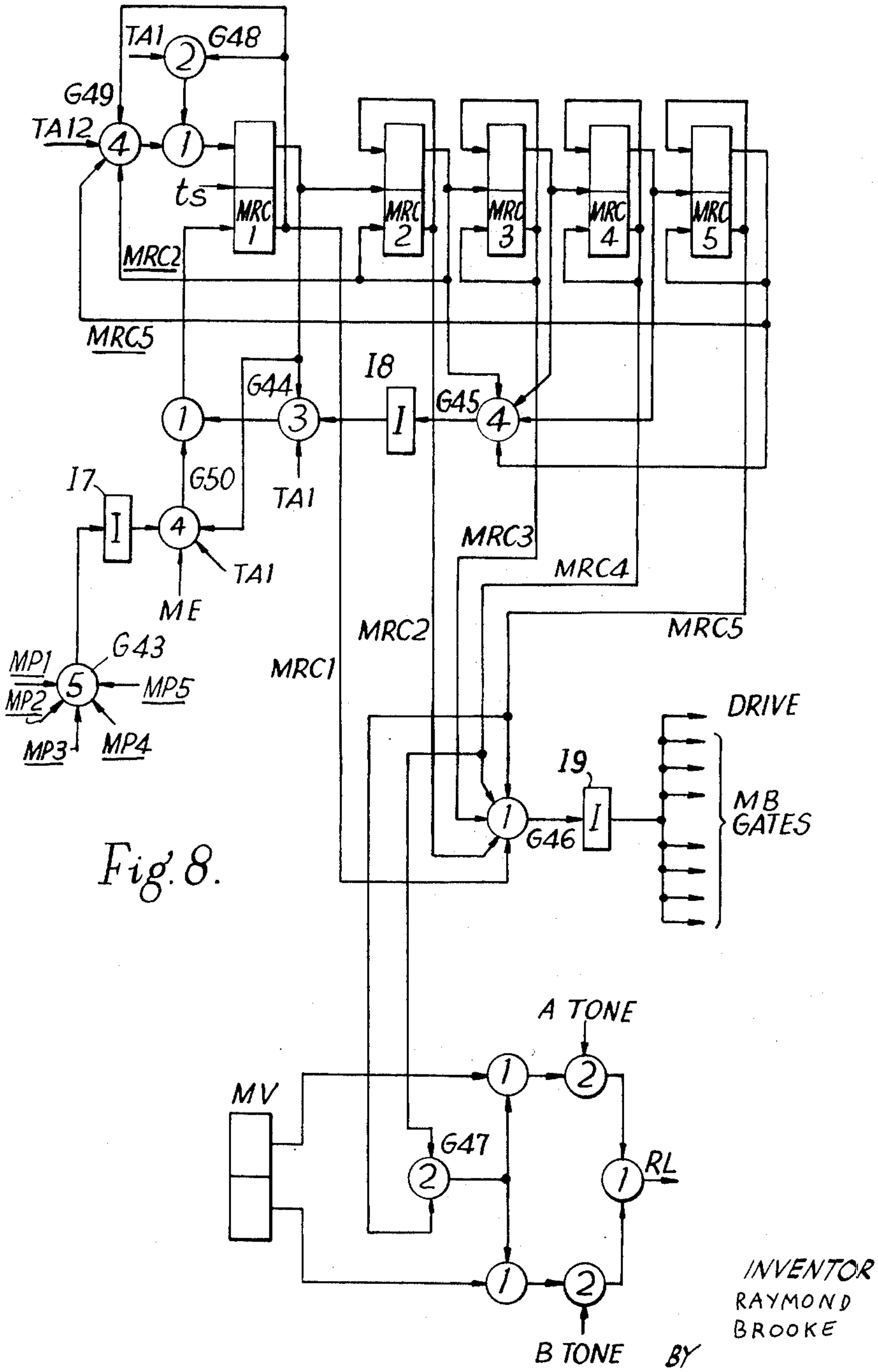

The invention will be better understood from the following description of two methods of carrying it into effect which should be taken in conjunction with the accompanying drawings comprising FIGURES 1–8. Of these FIGURE 1 is a timing diagram indicating the time sequence of the operations which take place at the transmitting and receiving ends when an error is automatically detected if reversing equipment is employed at both ends. FIGURE 2 shows diagrammatically the control equipment provided at the receiving end in these circumstances and also includes a timing diagram, while FIGURE 3 similarly shows the control equipment provided at the transmitting end and this also includes a relative timing diagram. FIGURE 4 is a simplified timing diagram similar to the lower part of FIGURE 1 for the case in which use is made of a reversible counter in conjunction with a non-reversible reperforator. The timing diagrams in FIGURES 2 and 3 are not strictly consistent with that in FIGURE 1 as regards the intervals between the different signals. FIGURES 5–8 relate to the arrangement in which timing devices are employed at both ends and only the tape reader is reversible. FIGURE 5 is a timing diagram showing the sequence of operations at the transmitting and receiving ends respectively, together with the operation of the associated counters which comprise a series of toggles. FIGURE 6 is a generally similar timing diagram but indicates the sequence of operations if the supervisory signal is simulated by a burst of noise. This means that, contrary to what normally happens, the counter at the transmitting end is set in operation before that at the receiving end. FIGURE 7 is a logic diagram showing the operation of the counter and associated equipment at the transmitting end and FIGURE 8 is a similar logic diagram for the equipment at the receiving end.

The operation of the system assumes that a reverse channel is available in addition to the ordinary transmission channel and that control over the reverse channel is effected by the use of supervisory tone. This is applied continuously and its absence, due for instance to a break in the signalling cable, serves to arrest the operation of the transmitter. It is assumed in the present instance that two different tones are applied alternately at a suitable repetition frequency and a control signal may then be achieved by applying the two tones simultaneously. Alternatively different single tones may be used for normal working and error signalling respectively or one may comprise a single tone and the other a plurality.

The general method of operation of the first embodiment is that when a mutilated character is detected at the receiving end, punching does not take place but the tape is advanced one step as for an ordinary character. At the same time, the tone transmission is altered and both tones are transmitted simultaneously over the line for a time sufficiently long to ensure reliable reception at the transmitting end. Stepping of the tape at the receiving end continues but no further punching takes place at this time. At the transmitting end when the simultaneous tone signal is recognised, the operation is reversed, that is to say the tape is driven backwards so that the various characters which have just been sent are transmitted again in reverse order. However, one of these characters is replaced by a character forming a reverse code and when this is detected at the receiving end, the supervisory tones again become alternate instead of simultaneous and also the reperforator is reversed so that it is now driven backwards but again no punching takes place. When the return to normal supervisory tone transmission is detected at the transmitting end, the reverse code is again sent and also the tape reader reverts to normal operation and therefore repeats the transmission of the characters which have been sent twice already so as to include the character which originally suffered mutilation. When the receiving equipment detects the second reverse code which reaches it after the normal line delay, the reperforator reverts to normal operation, that is to say the tape is stepped forward and punching takes place in normal manner. If suitable precautions are taken as provided according to the invention, the punching operation will now be resumed from the point at which it was arrested and on the assumption that the offending character is now transmitted correctly, the two tapes will be identical.

To facilitate the understanding of the operation, the tape positions in the reader are numbered in the upper part of FIGURE 1 and similarly the tape positions in the reperforator are correspondingly numbered in the lower part. It will be seen that the tape at the receiving end exactly follows the back spacing movement of the tape at the transmitting end, though always with a delay of two steps which is assumed to be the effective transmission time over the line. There will be a similar delay for transmission of the change in the tone in the reverse direction and a further delay for the response time of the equipment. This latter delay will be made as short as possible.

Considering now the detailed circuits of FIGURE 2 representing equipment at the receiving end, this comprises the toggle circuits MTC and MRC controlling respectively the tone application and the direction of movement of the reperforator. The circuits also include the single-shot multivibrator STC which is provided to prevent false operation in the event of mutilation of the reverse code.

It will be understood that during normal operation, the toggles MTC and MRC are in the reset position and accordingly a circuit is completed over gate G10 and the punch control lead PU to enable punching to take place. Similarly, over gate G9, stepping pulses from lead SP are applied to the lead FD to permit forward drive of the reperforator. The multivibrator MV operates continuously at a suitable speed and by way of gates G11 and G12 permits the A and B tones to be applied alternately to the tone control lead TC.

When an error is detected, potential is applied to the lead ED by equipment of known type responsive to the parity checks provided by the code used. Accordingly toggle MTC is set by way of the 5-input gate G1 provided that the code is not the start code SAC, the stop code SOC or the reverse code RC, that is, inputs representing the inverses of these signals (indicated by underlining) are available. MTC then provides an additional circuit so that the two tones are applied in both positions of the multivibrator MV, that is to say the two tones are applied simultaneously and continuously to the lead TC. The setting of MTC also closes the gate G10 and thus removes potential from the lead PU so arresting the punching operation.

When the presence of the two simultaneous tones is detected at the transmitting end, a reverse code character is sent back which when it becomes effective results in the application of potential to lead RC and thereupon the toggle MTC is reset by way of the gate G2 and at the same time the toggle MRC is operated. Gate G2 is controlled in addition by an input which has been labelled TA$n$ which is a clock waveform in which $n$ corresponds to the last element in the character. In practice, a convenient number of elements in the character would be 10 or 20 so that TA$n$ would then be either TA10 or TA20. Both toggles are also dependent on strobe pulses represented by $ts$ which occur at the repetition frequency of the individual TA clock pulses.

The resetting of toggle MTC restores the tone signal to the normal arrangement of alternate tones, while the operation of MRC has the effect of closing gate G9 and opening gate G8 which means that pulses from SP are supplied to the reverse drive lead RD of the reperforator and it is driven backwards.

The effect at the transmitting end of the restoration of the normal tone signals is to cause the transmission of the reverse code a second time and accordingly potential on lead RC applied to gate G13 and by way of the delay line DL to gate G3 causes the resetting of toggle MRC. The delay line is such as to produce a delay equivalent to one character. On the resetting of toggle MRC, conditions are completely restored to normal and potential is applied to the lead FD to cause forward drive and also potential is again applied to lead PU so that punching takes place.

The single shot multivibrator STC is initially set over gate G4 when an error is detected and it is arranged to reset after a period of 250 ms. which is normally ample time for the reverse code to be received. Similarly when the reverse code is first received, that is to say immediately before MRC is operated, STC is again operated over gate G5. In this case also a further reverse code should be received back before STC restores if proper operation is taking place. If the reverse code suffers mutilation on either occasion so that it is not properly received, an output will be obtained when STC resets by way of either gate G6 or G7 due to the continued operation of MTC or MRC and this output is fed to an inverter I1. The lack of output from this has the effect of closing gates G11 and G12 so that nothing is connected to lead TC and the tones are cut off entirely. This in accordance with usual practice has the effect of stopping the operation of the tape reader at the transmitter as explained in connection with FIGURE 3 and action must then be taken by the operator to deal with the situation and restore proper sending. It will be appreciated also that the tones will be entirely removed in the case of a line break in which case it is obviously undesirable that the transmitter should continue to send.

Considering now the operation at the transmitting end with reference to FIGURE 3, the equipment there for control purposes comprises two toggle circuits MRC1 and MRC2. MRC1 is employed to control the direction of stepping of the reader, while MRC2 controls the sending of the reverse code. When operation is proceeding normally, the two control tones producing the inputs A and B respectively will never be available together and consequently gate G21 is closed and toggles MRC1 and MRC2 are both in the reset condition. In these circumstances an output is obtained from the inverter I2 which by way of gate G24 provides a resetting impulse for MRC1 at the end of each character due to the clock pulse TA$n$. During normal operation gates G27 and G30 are both open and hence stepping impulses from lead RSP are able to pass through gate G31 and gate G32 to lead FEC to energise the forward escapement control and lead REC controlling the reverse drive is not energised in consequence of inverter I3.

When an error is detected at the receiving end however, and the tone control is changed to the simultaneous application of the two tones, gate G21 opens and provided the start code is not present and consequently an input SAC is available, the toggle MRC1 is set at the end of the character by way of gate G22. Moreover, if as is the case when the next strobe pulse $ts$ is received, toggle MRC1 is not operated, toggle MRC2 will also be operated by way of gate G23. Due to the operation of these toggles, the output normally obtained by way of gate G27 will be cut off so that there is no circuit for the forward escapement control but by way of inverter I3 and gate G33 a circuit is completed for the reverse escapement control so that the reader will now operate in the reverse direction. Toggle MRC2 only remains set for one character, being reset thereafter due to TA$n$ by way of gate G26. The operation of MRC2 also closes the gate G29 over which the data information is normally extended by way of lead SE to the modulator over lead MD for transmission and opens gate G28 so that the reverse code from lead RC is transmitted. When the alternation of tone signals is restored, no output will be obtained by way of gate G21 and consequently an output is obtained from the inverter I2 which in conjunction with the waveform TA$n$ is effective by way of gate G24 to reset toggle MRC1. A branch of this circuit extends over gate G25 to operate again toggle MRC2 dependent on the set condition of MRC1. This serves as before to transmit the reverse code and toggle MRC2 is reset after one character. The changeover to forward operation of the tape reader only takes place after the second operation of MRC2 when both MRC1 and MRC2 have been reset and gate G27 is opened. This will be more clearly seen from the timing diagram at the bottom of FIGURE 3. If the tones are both cut off, gate G31 is closed and no pulses can be transmitted for stepping in either direction.

Study of the different timing diagrams will make clear the sequence of operations and confirm that the reverse movement of the tape reader is faithfully followed by the reperforator. It may be pointed out that transmission continues steadily during the correcting operation but the reperforator does not punch from the time an error is detected until it is again driven forward after back spacing is completed. The reperforator makes the usual step forward in response to the mutilated character though it does not punch and it steps backward in response to each transmission of the reverse code.

If the suggested alternative is adopted of the use of a non-reversible reperforator and a reversible counter, it will be appreciated from FIGURE 4 that when an error is detected, the operation of the reperforator is arrested and the counter is operated by subsequent characters. This is reversed on the receipt of the reverse code and driven back past its original position. When the second reverse code is received, it is again stepped forward and on reaching zero causes the reperforator to resume its operation.

The second embodiment illustrated in FIGURES 5–8 will now be considered and it will be recalled that in this case only the tape reader is reversible and the desired method of operation is obtained by the use of timing devices or counters at the transmitting and receiving ends.

Considering first FIGURE 5, the first four lines indicate the times of operation of the toggle MTC1–MTC4 which constitute a binary counter at the transmitting end. The fifth line is a similar diagram for the toggle MTS1 which is responsive to the supervisory signal transmitted from the receiving end. The lower part of the diagram shows similar curves for the toggles MRC1–MRC5 comprising the counter at the receiving end. The characters successively transmitted are numbered arbitrarily so as to correspond at the transmitting and receiving equipments in order that the operation may be more readily understood.

It will be assumed that character 0 is found to be transmitted incorrectly as indicated by the square enclosure and consequently the error detection equipment causes the transmission of a supervisory signal back to the transmitter. As in the arrangement described in connection with FIGURES 1–4, it is assumed that two different tones are normally applied alternately with a predetermined repetition frequency and when a supervisory signal is required to be transmitted back, the two tones are both applied together. The equipment may further be arranged so that when neither tone is present, transmission from the tape reader is stopped, as this may well indicate that the transmission channel has become unserviceable or disconnected. After a short interval, here shown as the transmission time of six characters and representing the line and supervisory detection delay, the supervisory signal becomes effective at the transmitting end and produces the mutilation of the next character which is character 10. The tape reader is now reversed but continues to send in order to maintain end-to-end synchronism and this operation continues until the counter at the transmitting end has returned to normal which will be after $n/2+1$ characters if the counter at the receiving end runs for $n$ characters. During this period at some stage which is not critical, the supervisory signal ceases and its duration will conveniently be roughly equal to the transmission time of $n/4$ characters. When the transmitting end counter has returned to normal, which as shown will be at character −3, the tape reader is again reversed and now resumes its forward running.

Considering the operations at the receiving end, it will be noted that the assumed line delay amounts to three characters so that the error detection circuit becomes effective three characters after the character in question was transmitted. The counter at the receiver is then set in operation and the punching operation is arrested. Moreover though transmission is still taking place, the operation of the error detection equipment is modified so that the mutilated character 10 does not cause any disturbance to the operation. When the counter at the receiver has completed its operation, punching is resumed and it will be noted that this now represents punching of the character 0 on which the error was detected so that the effect on the output tape is that an unbroken sequence is obtained.

Considering now the arrangement of FIGURE 6, it will be seen that in the fifth line there is an unwanted operation of toggle MTS1 due to a burst of noise which simulates the supervisory signal. This causes the equipment at the transmitting end to react in the normal way, that is to say to transmit a mutilated character and then to reverse as regards the stepping of the tape reader. This reverse operation continues until the counter has been restored to normal whereupon forward operation is again resumed. At the receiving end, the mutilated character, namely character 4, serves to operate the error detection equipment so that a supervisory signal is sent back but does not affect the counter at the transmitting end since this is already running. The counter at the receiving end operates in the usual manner and while it is running, the operation of the punch is stopped. The essential difference between the two methods of operation is that in the FIGURE 6 arrangement, the counter at the transmitting end is set in operation ahead of the counter at the receiving end, while for normal error correction purposes the counter at the receiving end starts first. The relationship between their operations remains the same however and the desired effect is again obtained.

Considering now the receiver logic diagram of FIGURE 8 in association with the timing diagrams of FIGURE 5, it will be understood that the toggles MP1–MP5, only the reset outputs from which are shown, respond to the parity checks and if these are all satisfactory, the toggles are all in the reset condition at the end of a character. If this is not the case owing to a transmission error, an output is obtained from the inverter I7 since gate G43 is closed and a circuit is completed by way of gate G50 for setting the first toggle MRC1 of the counter and also for the remaining toggles MRC2–MRC4 in consequence of the manner in which they are connected. The operation of MRC1 is dependent on the strobe *ts* but the remaining toggles are strobed from the reset output of the preceding toggle. The circuit for MRC1 is dependent upon a time pulse TA1 similar to the TA pulses previously referred to, except that in this instance it is assumed that a character comprises twelve elements so that the pulses are TA1–TA12. The circuit is also dependent on the reset condition of a toggle ME which is used for stopping the reperforator apart from any question of error correction and is not directly concerned with the invention.

Toggle MRC1 is restored by way of gate G48 on the next TA1 pulse, i.e. at the end of the character and is then again operated by the following TA1 pulse over its second set circuit including gate G45, inverter I8 and gate G44 due to the fact that toggles MRC2–MRC5 are now set. The operation of the binary counting chain then proceeds in known manner until all the toggles are again reset as indicated in FIGURE 5. There is one modification to the straightforward operation however in order that the counter shall reset to zero after 28 rather than after 32 characters. This effect is provided by the additional reset circuit for toggle MRC1 which involves MRC2 and MRC5 and gate G49. This circuit produces a resetting operation at time pulse TA12 and then the toggle is immediately reoperated by the usual circuit involving TA1.

As long as any one of the counting toggles is operated, the circuit over gate G46 and inverter I9 is cut off for the drive to the reperforator and also the parallel circuits over the MB gates for the punch drive magnets. During the period in which MRC4 and MRC5 are both operated, that is, for eight characters at the beginning of the counting operation, a circuit is completed over gate G47 for transmitting both the supervisory tones simultaneously and this represents the supervisory signal to which the equipment at the transmitting end responds. As in the arrangement shown in FIGURE 3, the continuously running multivibrator MV serves to connect the A and B tones alternately to the reverse signalling channel RL. When gate G47 is opened however, both tones are connected up continuous so that they are transmitted simultaneously.

Considering now the circuits at the transmitting end as shown in FIGURE 7, it will be appreciated that if both A and B supervisory tones are present simultaneously as represented by outputs A and B and other conditions are favourable, a circuit will be completed over gates G34 and G35 for setting the toggle MTS1 and also for starting the counting chain consisting of toggles MTC1-MTC4. This is generally similar to the chain MTR1–MTR5 but is arranged in a reverse manner in that toggle MTC1 is first operated followed after one character by toggle MTC2 and subsequently by MTC3 and MTC4 as indicated in FIGURE 5. Toggle MTC1 is reset by the next TA12 pulse by way of gate G36 and is again set by the following TA12 pulse due to the fact that MTC2 is now set. This means that gate G37 is now closed so that an output is obtained from inverter I4 to open gate G38. Subsequent setting operations are due to the set condition of MTC3 and MTC4 and counting continues until all the toggles are reset in one operation. It can then only be restarted in response to a further supervisory signal. As long as toggles MTC2–MTC4 are all in the reset position, a circuit is provided by way of gate G37 for the forward escapement drive for the tape reader over lead FED. As soon as MTC2 is set however, this circuit is changed and owing to the effect of the inverter I4, the reverse escapement drive is connected up over lead RED instead of the forward drive. The information to be transmitted represented by SE normally passes to the transmitter over lead TM through the gate G39 controlled by the reset output of MTC1. During the first character however, this gate is closed due to the operation of MTC1 and accordingly a blank character is transmitted which does not meet the parity requirements and therefore initiates error correction if this has not already been done. Subsequent characters transmitted during the operation of toggle MTC1 are normal since they pass through the gate G40 controlled from the inverter I4.

It will be noted that during normal operation when the A and B tones are applied alternately, no output is obtained from either gate G34 or gate G41 and hence inverter I5 provides a reset circuit for toggle MTS1. If neither tone is received, an output is obtained from gate G41 and hence no output is available from the inverter I6. According gate G42 is closed and the reader stepping pulses from lead RSP are cut off so that the tape reader is unable to step in either direction.

It may be mentioned that the toggle MS1 whose set output applied to gate G35 influences the starting of the counter is only operated while the tape reader is stepping and thus serves to prevent false operation when no sending is taking place.

The invention may also be applied to tape having the information recorded magnetically instead of by punching.

Accordingly the invention by exploiting the properties of reversible tape readers provides an automatic error correcting facility which gives notable advantages with very simple control equipment.

I claim:

1. In a system for reproducing at a receiving point a punched tape located at a remotely situated transmitting point, a signalling channel connecting the transmitting and receiving points, a reversible tape reader at the transmitting point, means for stepping said tape reader forward to transmit signals over said channel in accordance with the punchings in said tape, a punch at the receiving point, error detecting means responsive to the incorrect receipt of a character transmitted over said channel, means controlled by said error detecting means for arresting the operation of said punch, signalling means also controlled by said error detecting means for transmitting a signal back to said tape reader, means responsive to said signal for stepping said tape reader backward beyond the character which was incorrectly received while still transmitting signals over said channel, means for thereafter causing said tape reader to resume forward stepping and means for causing said punch to resume its punching operation as soon as the said character is again received.

2. In a system for reproducing punched tape according to claim 1, means for transmitting suitable parity elements in each character whereby if a received character does not conform to parity checks an error is detected.

3. In a system for reproducing at a receiving point a punched tape located at a transmitting point, a signalling channel connecting the transmitting and receiving points, a reversible tape reader at the transmitting point, means for stepping said reader forward to transmit signals over said channel in accordance with the punchings in said tape, a stepping punch at the receiving point, error detecting means responsive to the incorrect receipt of a character transmited over said channel, means controlled by said error detecting means for arresting both the stepping and the punching operation of said punch, signalling means also controlled by said error detecting means for transmitting a signal back to said tape reader, means responsive to said signal for stepping said tape reader backward beyond the character which was incorrectly received, said backward stepping operation serving to transmit signals over said channel, means for thereafter causing said tape reader to resume forward stepping and means for causing said punch to resume both its stepping and punching operations as soon as the said character is again received.

4. In a system for reproducing punched tape according to claim 3, means for transmitting supervisory signals of two different frequencies alternately from the receiving point to the transmitting point and means for transmitting said two frequencies simultaneously to constitute an error signal.

5. In a system for reproducing at a receiving point a punched tape located at a transmitting point, a signalling channel connecting the transmitting and receiving points, a reversible tape reader at the transmitting point, means for stepping said tape reader forward to transmit signals over said channel in accordance with the punchings in said tape, error detecting means responsive to the incorrect receipt of a character transmitted over said channel, means controlled by said error detecting means for arresting the operation of said punch, signalling means also controlled by said error detecting means for transmitting an error signal back to said tape reader, means responsive to the receipt of said error signal for stepping said tape reader backward, signalling means also responsive to the receipt of said error signal for transmitting a first characteristic signal over said channel, means responsive to the receipt of said first characteristic signal for causing said punch to step backward and terminate said error signal transmitted to said tape reader, means responsive the termination of said error signal for causing said tape reader to resume its forward stepping and transmit a second characteristic signal to said punch, and means responsive to said second signal for causing said punch to resume its punching operation and forward stepping.

6. In a system for reproducing punched tape according to claim 5, a timing device at said receiving point, means for setting said device in operation responsive to the operation of said error detecting means, and means for transmitting a supervisory signal to said transmitting point if said first characteristic signal has not been received when said timing device completes its operation.

7. In a system for reproducing punched tape according to claim 5, a timing device at said receiving point, means for setting said device in operation responsive to the receipt of said first characteristic signal over said channel, and means for transmitting a supervisory signal to said transmitting point if said second characteristic signal has not been received when said timing device completes its operation.

8. In a system for reproducing at a receiving point a punched tape located at a transmitting point, a signalling channel connecting the transmitting and receiving points, a reversible tape reader at the transmitting point, means for stepping said tape reader forward to transmit signals over said channel in accordance with the punchings in said tape, error detecting means responsive to the incorrect receipt of a character transmitted over said channel, a reversible counter at said receiving point, means controlled by said error detecting means for arresting the operation of said punch and causing said counter to be operated one step for each character received, signalling means also controlled by said error detecting means for transmitting an error signal back to said tape reader, means responsive to the receipt of said error signal for stepping said tape reader backward, signalling means also responsive to the receipt of said error signal for transmitting a characteristic signal over said channel, means responsive to the receipt of said characteristic signal for causing said counter to reverse its operation and for transmitting a second signal to said tape reader, means responsive to the receipt of said second signal for causing said tape reader to resume its forward stepping and transmit a further signal to said receiving point, means responsive to said further signal for causing said counter to again reverse its operations, and means for causing the operation of said punch to be resumed when said counter again reaches its original position.

9. In a system for reproducing at a receiving point a punched tape located at a transmitting point, a signalling channel connecting the transmitting and receiving points, a reversible tape reader and a first timing device at the transmitting point, a punch and a second timing device at the receiving point, means for stepping said tape reader forward to transmit signals over said channel in accordance with the punchings in said tape, error detecting means responsive to the incorrect receipt of a character transmited over said channel, means controlled by said error detecting means for arresting the operation of said punch, means also controlled by said error detecting means for setting said second timing device in operation, signalling means also controlled by said error detecting means for transmitting an error signal back to said transmitting point, means responsive to said error signal for causing said tape reader to step backward, means also responsive to said error signal for setting said first timing device in operation, means for causing said tape reader to step forward again responsive to said first timing device completing its operation, and means for causing said punch to resume its operation responsive to said second timing device completing its operation, the periods of said first and second timing devices being different and so chosen that punching is resumed on the retransmission of the character which was initially incorrectly received.

10. In a system for reproducing at a receiving point a punched tape located at a transmitting point, a signalling channel connecting the transmitting and receiving points, a reversible tape reader and a first timing device at the transmitting point, a punch and a second timing device at the receiving point, means for stepping said tape reader forward to transmit signals over said channel in accordance with the punchings in said tape, error detecting means responsive to the incorrect receipt of a character transmitted over said channel, means controlled by said error detecting means for arresting the operation of said punch, means also controlled by said error detecting means for setting said second timing device in operation, signalling means also controlled by said error detecting means for transmitting an error signal back to said transmitting point, means responsive to said error signal for causing said tape reader to step backward and transmit a mutilated character, means also responsive to said error signal for setting said first timing device in operation, means for causing said tape reader to step forward again responsive to said first timing device completing its operation, and means for causing said punch to resume its operation responsive to said second timing device completing its operation, the periods of said first and second timing devices being different and so chosen that punching is resumed on the retransmission of the character which was initially incorrectly received.

11. In a system for reproducing punched tape according to claim 10, means for transmitting said mutilated character in the form of absence of signals whereby parity checks to which all characters are regarded to conform are not met and hence an error is detected.

References Cited by the Examiner

UNITED STATES PATENTS

| | | | |
|---|---|---|---|
| 2,235,755 | 3/1941 | Bakker et al. | 178—23 X |
| 2,903,514 | 9/1959 | Van Duuren | 178—23 |
| 2,961,643 | 11/1960 | Ayres et al. | 340—146.1 X |
| 2,983,789 | 5/1961 | Hennig | 178—23 |
| 2,985,714 | 5/1961 | Barbeau et al. | 178—23 |

MALCOLM A. MORRISON, *Primary Examiner.*

ROBERT C. BAILEY, *Examiner.*

S. DAVID, M. P. ALLEN, M. J. SPIVAK, *Assistant Examiners.*